(12) United States Patent
Ethirkottai Sundararajan

(10) Patent No.: US 12,301,718 B2
(45) Date of Patent: May 13, 2025

(54) NFT INTERACTION PROCESSING SYSTEM AND METHOD

(71) Applicant: Visa International Service Association, San Francisco, CA (US)

(72) Inventor: Anandan Ethirkottai Sundararajan, Karnataka (IN)

(73) Assignee: Visa International Service Association, San Francisco, CA (US)

( * ) Notice: Subject to any disclaimer, the term of this patent is extended or adjusted under 35 U.S.C. 154(b) by 233 days.

(21) Appl. No.: 18/061,863

(22) Filed: Dec. 5, 2022

(65) Prior Publication Data
US 2024/0187233 A1  Jun. 6, 2024

(51) Int. Cl.
*H04L 9/30* (2006.01)
*H04L 9/32* (2006.01)
*H04L 9/40* (2022.01)

(52) U.S. Cl.
CPC .............. *H04L 9/3213* (2013.01); *H04L 9/30* (2013.01); *H04L 2209/60* (2013.01)

(58) Field of Classification Search
CPC ...... H04L 9/3213; H04L 9/30; H04L 2209/60
USPC ......................................................... 713/168
See application file for complete search history.

(56) References Cited

U.S. PATENT DOCUMENTS

| | | | |
|---|---|---|---|
| 9,996,835 B2 | 6/2018 | Dill et al. | |
| 11,443,838 B1* | 9/2022 | Cordonnier | G16H 50/20 |
| 2016/0232527 A1* | 8/2016 | Patterson | G06Q 20/405 |
| 2020/0051074 A1* | 2/2020 | Suh | G06Q 20/36 |
| 2020/0053081 A1* | 2/2020 | Park | H04L 9/3239 |
| 2022/0210061 A1* | 6/2022 | Simu | H04L 9/3239 |
| 2022/0222364 A1* | 7/2022 | Roberts | G06F 21/64 |
| 2022/0239495 A1* | 7/2022 | Norton | H04L 9/0825 |
| 2022/0318233 A1* | 10/2022 | Martinez | H04L 9/50 |
| 2023/0034169 A1* | 2/2023 | Ferenczi | H04L 63/0823 |
| 2023/0108366 A1* | 4/2023 | Tang | G06Q 20/3672 705/66 |
| 2023/0119691 A1* | 4/2023 | Kurian | H04L 9/3213 713/164 |
| 2023/0186299 A1* | 6/2023 | Huggins | H04L 63/105 705/44 |
| 2023/0206218 A1* | 6/2023 | Defour | G06Q 20/02 705/67 |
| 2023/0306412 A1* | 9/2023 | Gaur | G06Q 20/1235 |
| 2023/0368185 A1* | 11/2023 | Padmanabhan | G06Q 20/3672 |

(Continued)

OTHER PUBLICATIONS

Qin Wang; Non-Fungible Token (NFT): Overview, Evaluation, Opportunities and Challenges; Arxiv.org; Year:2015; pp. 1-22.*

(Continued)

*Primary Examiner* — Monjur Rahim
(74) *Attorney, Agent, or Firm* — Kilpatrick Townsend & Stockton LLP

(57) ABSTRACT

A method includes receiving, by a server computer, an authorization request message comprising a contract address and a token identifier during an interaction between a user device and a resource provider computer. The server computer verifies that an NFT, referenced by the contract address and the token identifier, is assigned to a first address and a second address. If verified, server computer determines a credential stored in association with the contract address and the token identifier using a conversion table. The server computer processes the interaction with the credential.

20 Claims, 8 Drawing Sheets

(56) References Cited

U.S. PATENT DOCUMENTS

2023/0396445 A1* 12/2023 Padmanabhan ........... H04L 9/50
2024/0005386 A1*  1/2024 Thurairatnam .... G06Q 20/4014
2024/0171398 A1*  5/2024 Kendapadi ................ H04L 9/50
2024/0187233 A1*  6/2024 Ethirkottai Sundararajan ............
                                                G06Q 20/385

OTHER PUBLICATIONS

EP23214409.7, "Extended European Search Report", Jan. 30, 2024, 8 pages.
"Non-Fungible Tokens (NFTs) vs Verifiable Credentials (VCs)", Affinidi Pte. Ltd., May 3, 2021, 7 pages.
"NFTs as Keys. Web3 Authentication in the Pseudonymous Economy", LinkedIn, Jul. 18, 2021, 20 pages.

* cited by examiner

NFT INTERACTION PROCESSING SYSTEM AND METHOD

CROSS-REFERENCES TO RELATED APPLICATIONS

None.

BACKGROUND

Credentials can be used to authorize an interaction conducted by an entity. Many credentials (e.g., PANs etc.) are tied to a particular network and hence are dependent on the network availability for interaction processing.

When the credential is issued, the issuer can decide on the network, based on user choice, contracts they have with network, network location availability, network ease of use, network security levels, etc. If the network is not available at the time of interaction, then the user will be forced to choose another means to complete the interaction.

Other problems relate to data security. Credentials such as employee badge credentials, payment credentials and the like can be stolen (e.g., through hacking, phishing, etc.) by unauthorized parties and used.

Embodiments of the disclosure address this problem and other problems individually and collectively.

SUMMARY

One embodiment is related to a method comprising: receiving, by a server computer, an authorization request message comprising a contract address and a token identifier during an interaction between a user device and a resource provider computer; verifying, by the server computer, that a non-fungible token (NFT), referenced by the contract address and the token identifier, is assigned to a first address and a second address; if verified, determining, by the server computer, a credential stored in association with the contract address and the token identifier using a conversion table; processing, by the server computer, the interaction with the credential.

Another embodiment is related to a server computer comprising: a processor; and a computer-readable medium coupled to the processor, the computer-readable medium comprising code executable by the processor for implementing a method comprising: receiving an authorization request message comprising a contract address and a token identifier during an interaction between a user device and a resource provider computer; verifying that a non-fungible token (NFT), referenced by the contract address and the token identifier, is assigned to a first address and a second address; if verified, determining a credential stored in association with the contract address and the token identifier using a conversion table; processing the interaction with the credential.

Another embodiment is related to a method comprising: receiving, by a service provider computer from a server computer, a non-fungible token (NFT) request message comprising a first address associated with a user and a second address associated with an entity; recording, by the service provider computer, ownership of an NFT to the first address and the second address with a blockchain network, wherein the NFT is identified by NFT identifying data comprising a contract address and a token identifier; and providing, by the service provider computer, the NFT identifying data to the server computer, wherein the server computer provides the NFT identifying data comprising the contract address and the token identifier to a user device, wherein the user device subsequently provides the NFT identifying data to the entity in an interaction, wherein the entity validates the NFT in the interaction.

Further details regarding embodiments of the disclosure can be found in the Detailed Description and the Figures.

DETAILED DESCRIPTION

Figure 1:
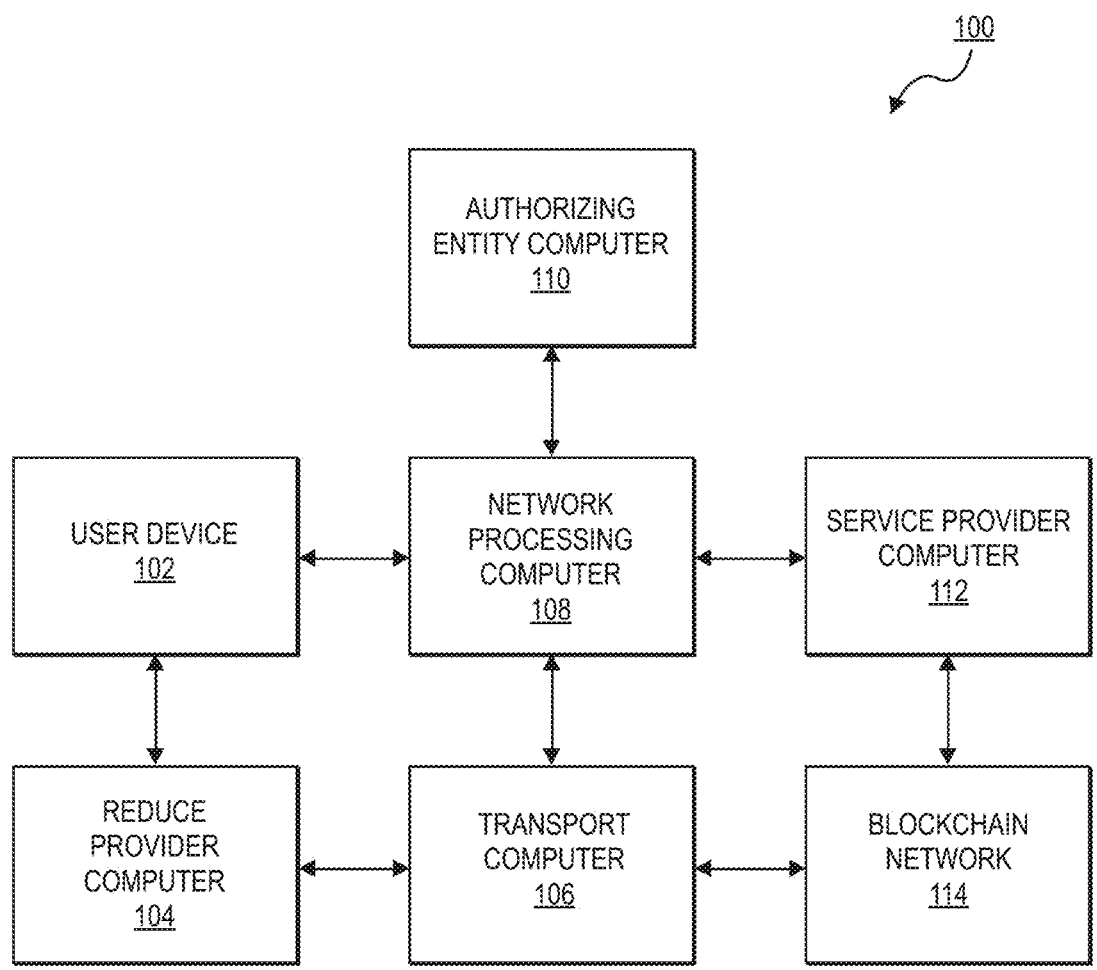
FIG. 1 shows a block diagram of a credential provisioning and verification system according to embodiments.

Prior to discussing embodiments of the disclosure, some terms can be described in further detail.

A "user device" may be a device that is operated by a user. Examples of user devices may include a mobile phone, a smart phone, a card, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

A "user" may include an individual. In some embodiments, a user may be associated with one or more personal accounts and/or mobile devices. The user may also be referred to as a cardholder, account holder, or consumer in some embodiments.

A "user identifier" can include any piece of data that can identify a user. A user identifier can comprise any suitable alphanumeric string of characters. In some embodiments, the user identifier may be derived from user identifying information. In some embodiments, a user identifier can include an account identifier associated with the user.

"Credentials" may comprise any evidence of authority, rights, or entitlement to privileges. For example, access credentials may comprise permissions to access certain tangible or intangible assets, such as a building or a file. Examples of credentials may include passwords, passcodes, or secret messages. In another example, payment credentials may include any suitable information associated with and/or identifying an account (e.g., a payment account and/or payment device associated with the account). Such information may be directly related to the account or may be derived from information related to the account. Examples of account information may include an "account identifier" such as a PAN (primary account number or "account number"), a token, a subtoken, a gift card number or code, a prepaid card number or code, a user name, an expiration date, a CVV (card verification value), a dCVV (dynamic card verification value), a CVV2 (card verification value 2), a CVC3 card verification value, etc. An example of a PAN is a 16-digit number, such as "4147 0900 0000 1234". In some embodiments, credentials may be considered sensitive information.

A "non-fungible token" (NFT) can be a cryptographic asset, cryptographic token, or digital ledger object that is recorded on a blockchain. Non-fungible tokens are typically indivisible, and not mutually interchangeable. A given non-fungible token has unique information, attributes, or characteristics, such as permanent, unalterable metadata that describes or defines its authenticity. Ownership of a non-fungible token is generally transferrable. In contrast, other "fungible" cryptocurrencies, such as Bitcoin, are identical to each other and can be traded or exchanged as identical units and are usually infinitely subdividable. Non-fungible token may function as unique certificates of authenticity, making them suitable for use to "tokenize" digital assets, such as copyrighted works. In some embodiments, a non-fungible token may be implemented according to a token standard. For example, a non-fungible token may be implemented according to the ERC-20 standard, the ERC-721 standard, the ERC-994 standard, the ERC-998 standard, the ERC-1155 standard, and/or any other token standard configured for the Ethereum blockchain network or any other blockchain network that includes a virtual machine for executing contract bytecode on its blockchain. Each token standard may have different requirements of features. A non-fungible token can have those features to be considered a non-fungible token that implements that standard and that can be used by smart contracts or applications that also are generated according to that token standard.

A "token identifier" may include data that identifies a non-fungible token. A token identifier can be a unique value. A token identifier can be a uint256 value. A token identifier can be included inside a smart contract (e.g., ERC-721) for a non-fungible token. A token identifier can be a static value for the life of the contract as indicated in the associated smart contract. Each non-fungible token for a certain smart contract can have a different token identifier.

A "contract address" may include a digital address that identifies a smart contract. A contract address can identify a smart contract on a blockchain that created, maintains, and transfers non-fungible tokens. A token identifier and a contract address, as a pair, can be globally unique and can function as a fully qualified identifier for a specific asset on a blockchain.

A "digital wallet" may contain electronic information for conducting transactions. A digital wallet may store user profile information, payment credentials, bank account information, cryptocurrency account information, one or more digital wallet identifiers and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like. A digital wallet may be designed to streamline the purchase and payment process. A digital wallet may allow the user to load one or more payment cards onto the digital wallet so as to make a payment without having to enter an account number or present a physical card.

A "digital wallet provider" may include an entity, such as an issuing bank, which issues a digital wallet to a user that enables the user to conduct financial transactions. A digital wallet provider may provide standalone user-facing software applications that store account numbers on behalf of a cardholder (or other user) to facilitate payments at more than one unrelated merchant, perform person-to-person payments, or load financial value into the digital wallet. A digital wallet provider may enable a user to access its account via a personal computer, mobile device, or access device. Additionally, a digital wallet provider may also provide one or more of the following functions: storing one or more payment cards, maintaining one or more cryptocurrency accounts, storing other information including billing address, shipping addresses, and transaction history, initiating a transaction by one or more methods, such as providing a username and password, NFC, or a physical token, and may facilitate pass-through or two-step transactions.

A "currency exchange" may be a computer, a group of computers, an entity, or a group of entities that facilitate exchanges between cryptocurrencies and/or fiat currencies at the request of parties. A currency exchange may manage any suitable number of accounts associated with registered parties.

A "cryptocurrency network" may include a one or more computers that participate in maintaining a cryptocurrency ledger. In some cryptocurrency networks, the distributed cryptocurrency ledger may comprise a blockchain.

A "blockchain" can be a distributed database that maintains a continuously growing list of records secured from tampering and revision. A blockchain can be a non-fungible token blockchain, a cryptocurrency blockchain, or a combination thereof. A blockchain may include a number of blocks of interaction records. Each block in the blockchain can contain also include a timestamp and a link to a previous block. Stated differently, interaction records in a blockchain may be stored as a series of "blocks," or permanent files that include a record of a number of interactions occurring over a given period of time. Blocks may be appended to a blockchain by an appropriate node after it completes the block and the block is validated. Each block can be associated with a block header. In embodiments of the invention, a blockchain may be distributed, and a copy of the blockchain may be maintained at each full node in a verification network. Any node within the verification network may subsequently use the blockchain to verify interactions. A blockchain can be stored, maintained, and updated in a distributed manner in a peer-to-peer network. For example, in a cryptocurrency application, such as Bitcoin or Ethereum, Ripple, Dash, Litecoin, Dogecoin, zCash, Tether, Bitcoin Cash, Cardano, Stellar, EOS, NEO, NEM, Bitshares, Decred, Augur, Komodo, PIVX, Waves, Steem, Monero, Golem, Stratis, Bytecoin, Ardor, or in digital currency exchanges, such as Coinbase, Kraken, CEX.IO, Shapeshift, Poloniex, Bitstamp, Coinmama, Bisq, LocalBitcoins, Gemini and others where the distributed ledger represents each transaction and where units of the cryptocurrency are transferred between entities.

A "blockchain network" can include a computer network that maintains a blockchain.

A "block header" can be a header including information regarding a block in a blockchain. A block header can be used to identify a particular block on a blockchain. A block header can comprise any suitable information, such as a previous hash, a Merkle root, a timestamp, and a nonce. In some embodiments, a block header can also include a difficulty value.

A "non-fungible token blockchain" can include a blockchain that stores non-fungible tokens. A non-fungible token blockchain can include non-fungible tokens and smart contracts. A non-fungible token blockchain can be utilized to transfer a non-fungible token from one public address to another public address.

A "cryptocurrency blockchain" can include a blockchain that stores cryptocurrency. A cryptocurrency blockchain can be utilized to transfer cryptocurrency from one public address to another public address.

A "cryptocurrency" can include a digital currency. A cryptocurrency can include a digital currency in which transactions are verified and records maintained by a decentralized system using cryptography. A cryptocurrency may not need to be maintained by a centralized authority.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like. In other embodiments, an interaction can include a payment transaction in which two devices can interact to facilitate a payment. An interaction can be a transfer of a resource from a first entity to a second entity.

A "resource" can include digital items and/or physical items. A resource can be an item that is obtainable. A resource can be owned by an entity. A resource can be a physical item such as goods, etc. A resource can be a digital item such as non-fungible tokens, etc.

A "network processing computer" may include a server computer used for interaction processing. In some embodiments, the network processing computer may be coupled to a database and may include any hardware, software, other logic, or combination of the preceding for servicing the requests from one or more client computers. The network processing computer may comprise one or more computational apparatuses and may use any of a variety of computing structures, arrangements, and compilations for servicing the requests from one or more client computers. In some embodiments, a network processing computer may include data processing subsystems, networks, and operations used to support and deliver authorization services, exception file services, and clearing and settlement services. An exemplary network processing computer may include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system, which performs clearing and settlement services. The network processing computer may use any suitable wired or wireless network, including the Internet.

The network processing computer may process interaction-related messages (e.g., authorization request messages and authorization response messages) and determine the appropriate destination computer (e.g., an issuer computer) for the interaction-related messages. In some embodiments, the network processing computer may authorize interactions on behalf of an issuer. The network processing computer may also manage and/or facilitate the clearing and settlement of interactions.

An "authorization request message" may be an electronic message that requests authorization for an interaction. In some embodiments, it is sent to a transaction processing computer and/or an issuer of a payment card to request authorization for a transaction. An authorization request message according to some embodiments may comply with International Organization for Standardization (ISO) 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a username, an expiration date, etc. An authorization request message may also comprise "transaction information," such as any information associated with a current transaction, such as the transaction value, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

An "authorizing entity" may be an entity that authorizes a request. Examples of an authorizing entity may be an issuer, a governmental agency, a document repository, an access administrator, etc. An authorizing entity may operate an authorizing entity computer. An "issuer" may refer to a business entity (e.g., a bank) that issues and optionally maintains an account for a user. An issuer may also issue payment credentials stored on a user device, such as a cellular telephone, smart card, tablet, or laptop to the consumer, or in some embodiments, a portable device.

The term "verification" and its derivatives may include a process that utilizes information to determine whether an underlying subject is valid under a given set of circumstances. Verification may include any comparison of information to ensure some data or information is correct, valid, accurate, legitimate, and/or in good standing.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

Embodiments of the disclosure relate to creating and utilizing non-fungible tokens as credentials that are network independent. Any entity in any interaction processing network can validate the non-fungible tokens as credentials for conducting interactions.

Furthermore, some embodiments of the disclosure relate to issuing an NFT such that it is owned by two different entities. For example, the NFT can be issued to a user, so that the user can utilize the NFT during transactions. The NFT itself can also be partially issued to the user, such that it is co-owned by the issuer (e.g., an authorizing entity computer, a network processing computer, etc.) and the user. During an interaction (e.g., a transaction), the network can receive the NFT, verify that the user is a co-owner of the NFT, determine credentials associated with the NFT in a lookup/conversion table, and then provide the credentials to an authorizing entity computer for authorization of the interaction. Additionally, in some embodiments, the NFTs can expire, when the issuer/payment network decides to stop verifying the NFT during transactions.

In embodiments of the invention, the NFT can neither be replaced nor interchanged (e.g., with a fake NFT) because it has unique properties. Today, when an issuer issues credentials (e.g., payment credentials such as a PAN or token), the credentials are tied to and owned by an individual. Embodiments allow for the issuer to issue an NFT, such that is it used as a substitute for a credential since the NFT cannot be interchanged.

When computers receive the NFT, the NFT can be verified using a digital signature, which proves ownership. This verification can be performed by anyone in the interaction chain and hence the availability and dependency of a particular network is not a concern. Along with this benefit, the interaction can be registered in distributed public ledger.

FIG. 1 shows a system 100 according to embodiments of the disclosure. The system 100 comprises a user device 102, a resource provider computer 104, a transport computer 106, a network processing computer 108, an authorizing entity computer 110, a service provider computer 112, and a blockchain network 114.

The user device 102 can be in operative communication with the resource provider computer 104, the network processing computer 108, and the authorizing entity computer 110. The resource provider computer 104 can be in operative communication with the user device 102 and the transport computer 106. The transport computer 106 can be in operative communication with the resource provider computer 104 can the network processing computer 108. The network processing computer 108 can be in operative communication with the user device 102, the transport computer 106, the authorizing entity computer 110, and the service provider computer 112. The authorizing entity computer 110 can be in operative communication with the user device 102, the network processing computer 108, and the service provider computer 112. The service provider computer 112 can be in operative communication with the network processing computer 108, the authorizing entity computer 110, and the blockchain network 114. The blockchain network 114 can be in operative communication with the service provider computer 112. In some embodiments, the authorizing entity computer 110 and the network processing computer 108 can be in operative communication with the blockchain network 114.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1.

Messages between the devices included in the system 100 illustrated in FIG. 1 can be transmitted using a secure communications protocol such as, but not limited to, File Transfer Protocol (FTP); HyperText Transfer Protocol (HTTP); Secure Hypertext Transfer Protocol (HTTPS), SSL, ISO (e.g., ISO 8583) and/or the like. The communications network may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

The user device 102 can include a device operated by a user. The user device 102 can be a smart phone, a laptop computer, a desktop computer, a smart watch, a tablet, etc. The user device 102 can be programmed to allow the user to create and/or manage a cryptocurrency account with a digital wallet application installed on the user device 102. For example, the user device 102 can contain an application programmed to maintain user public keys, user private keys, and cryptocurrencies and non-fungible tokens associated with the user public keys. The user device 102 can be programmed to allow the user to perform interactions with resource provider computers.

The resource provider computer 104 may be a computer operated by a resource provider. The resource provider computer 104 may include one or more access devices, back end server computers, etc. In some embodiments, the resource provider computer 104 may be configured to generate and transmit authorization request messages for interactions (e.g., transactions). The resource provider computer 104 can provide resources to users upon the completion of interactions. In some embodiments, the resource provider computer 104 can host a webpage accessible by the user device 102 that can allow the user device 102 to initiate interactions with the resource provider computer 104.

The transport computer 106 can be a computer that receives and forwards authorization request and response messages, and that participates in clearing and settlement processes. In one embodiment, the transport computer 106 may be a computer operated by an acquiring entity.

The network processing computer 108 may include data processing subsystems, networks, and operations used to support and deliver authorization services, exception file services, and clearing and settlement services. An exemplary network processing computer may include VisaNet®. Network processing computers such as VisaNet® are able to process credit card transactions, debit card transactions, and other types of commercial transactions. VisaNet® in particular, includes a VIP system (Visa Integrated Payments system) which processes authorization requests and a Base II system which performs clearing and settlement services.

The authorizing entity computer 110 can include a computer that issues and maintains user accounts for users. The authorizing entity computer 110 can be a computer operated by an authorizing entity. The authorizing entity computer 110 may issue credentials for user accounts. The authorizing entity computer 110 may also be programmed to conduct authorization processes. The authorizing entity computer 110 can receive authorization request messages for interactions and can determine whether or not to authorize the interaction.

In some embodiments, the network processing computer 108 may determine, based on the data in the authorization request message, an authorizing entity computer 110 associated with user for the transaction. For example, the network processing computer 108 can read an account identifier and may determine that the first six digits of the account identifier comprises an issuer identification number (IIN) specifying an authorizing entity computer associated with user or user's credentials.

In some embodiments, the authorizing entity computer 110 may be a computer of an issuing entity that issues credentials and/or user devices to the user such as a bank, government agency, security network, etc. Upon determination of the authorizing entity computer 110, the network processing computer 108 may determine an address of authorizing entity computer 110, so that the authorization request message can be routed to authorizing entity computer 110 for authorization of the transaction.

The service provider computer 112 can include a computer that facilitates obtaining, transferring, and maintaining non-fungible tokens. The service provider computer 112 can be a non-fungible token marketplace computer. The service provider computer 112 can allow users to obtain (e.g., purchase) non-fungible tokens through a Web interface provided by a website maintained by the service provider computer 112. In some embodiments, the service provider computer 112 can allow a plurality of non-fungible token creator devices to create (e.g., mint) new non-fungible tokens and make the newly created non-fungible tokens available for purchase by users. The service provider computer 112 can interact with the blockchain network 114 to update ownership and other data related to the non-fungible tokens included in the blockchain network 114. The service provider computer 112 can be a non-fungible token marketplace such as OpenSea, Rarible etc.

The blockchain network 114 can include a blockchain that is maintained by a computer network. The blockchain network 114 can be a decentralized and distributed digital record. The blockchain network 114 can include a plurality of blocks with block headers. In some embodiments, the blocks on the blockchain network 114 can include smart contracts and/or non-fungible tokens. New blocks including new non-fungible tokens can be added to the blockchain network 114. The blockchain network 114 can maintain an NFT blockchain that stores one or more NFTs and one or more smart contracts.

Figure 2:
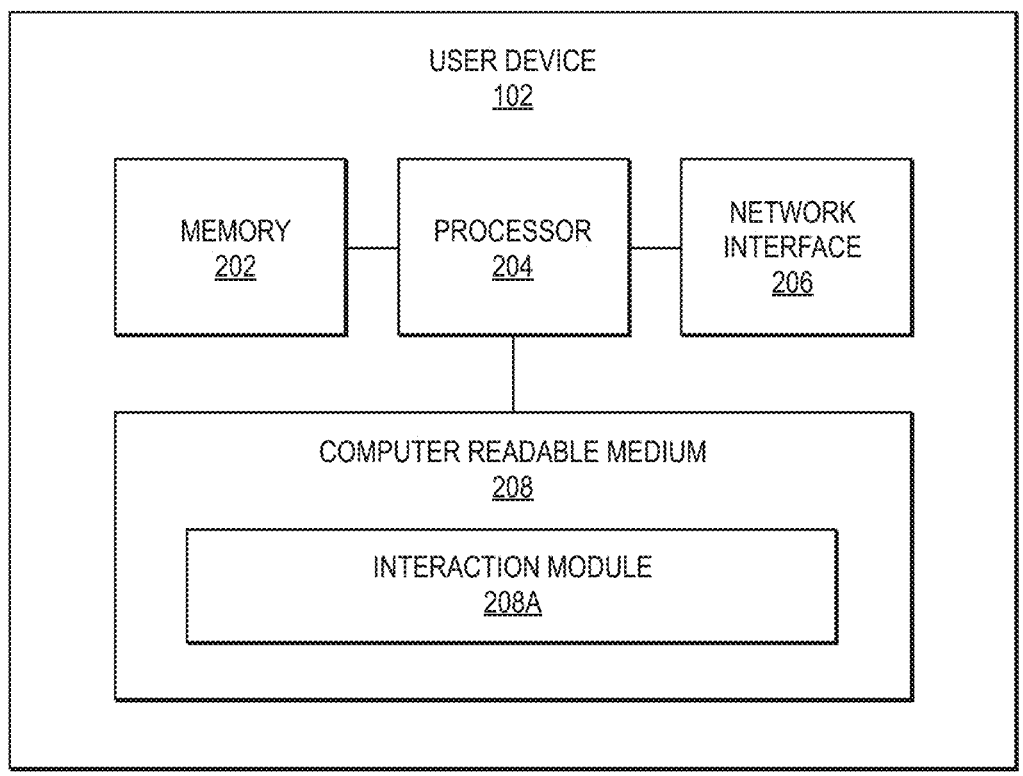
FIG. 2 shows a block diagram of components of a user device according to embodiments.

FIG. 2 shows a block diagram of a user device 102 according to embodiments. The exemplary user device 102 may comprise a processor 204. The processor 204 may be coupled to a memory 202, a network interface 206, and a computer readable medium 208. The computer readable medium 208 can comprise an interaction module 208A.

The memory 202 can be used to store data and code. For example, the memory 202 can store a user public key, a user private key, a contract address, a token identifier, etc. The memory 202 may be coupled to the processor 204 internally or externally (e.g., cloud based data storage), and may comprise any combination of volatile and/or non-volatile memory, such as RAM, DRAM, ROM, flash, or any other suitable memory device.

The computer readable medium 208 may comprise code, executable by the processor 204, for performing a method comprising: initiating, by a user device, an interaction with a resource provider computer; generating, by the user device, a digital signature using a user private key corresponding to a user public key, wherein the user public key is assigned ownership of a non-fungible token that is identified by a contract address and a token identifier; generating, by the user device, an interaction request message comprising the contract address, the token identifier, and the digital signature; and providing, by the user device, the interaction request message to the resource provider computer to process the interaction.

The interaction module 208A may comprise code or software, executable by the processor 204, for performing interactions. The interaction module 208A, in conjunction with the processor 204, can provide data to resource provider computers upon the initiation of an interaction. The interaction module 208A, in conjunction with the processor 204, can provide the contract address and the token identifier to a resource provider computer for an interaction. The interaction module 208A, in conjunction with the processor 204, can also provide the user public key to the resource provider computer.

The interaction module 208A, in conjunction with the processor 204, can generate a digital signature using the user private key that corresponds to the user public key, to which the NFT identified by the contract address and the token identifier is assigned. The interaction module 208A, in conjunction with the processor 204, can further provide the digital signature to the resource provider computer.

The network interface 206 may include an interface that can allow the user device 102 to communicate with external computers. The network interface 206 may enable the user device 102 to communicate data to and from another device (e.g., the resource provider computer 104, the network processing computer 108, the authorizing entity computer 110, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

Figure 3:
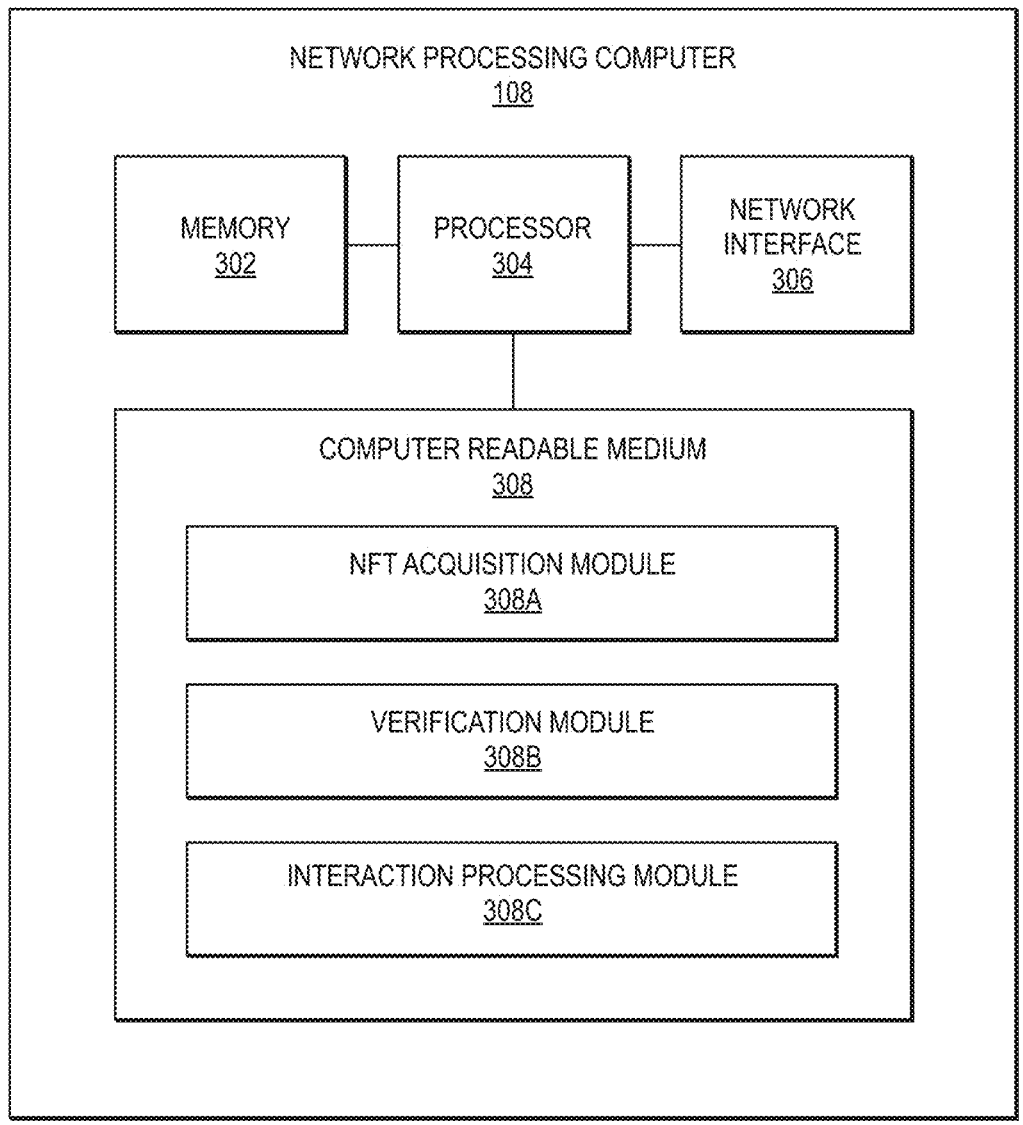
FIG. 3 shows a block diagram of components of a network processing computer according to embodiments.

FIG. 3 shows a block diagram of a network processing computer 108 according to embodiments. The exemplary network processing computer 108 may comprise a processor 304. The processor 304 may be coupled to a memory 302, a network interface 306, and a computer readable medium 308. The computer readable medium 308 can comprise a NFT acquisition module 308A, a verification module 308B, and an interaction processing module 308C.

The memory 302 can be used to store data and code and may be similar to the memory 202 as described herein. For example, the memory 302 can store a conversion table. The conversion table can associate credentials with NFTs as identified by a contract address and/or a token identifier.

The computer readable medium 308 may comprise code, executable by the processor 304, for performing a method comprising: receiving an authorization request message comprising a contract address and a token identifier during an interaction between a user device and a resource provider computer; verifying that an NFT, referenced by the contract address and the token identifier, is assigned to a first address and a second address; if verified, determining a credential stored in association with the contract address and the token identifier using a conversion table; modifying the authorization request message to include the credential; and providing the authorization request message to an authorizing entity computer for authorization for the interaction.

The NFT acquisition module 308A may comprise code or software, executable by the processor 304, for obtaining NFTs. The NFT acquisition module 308A, in conjunction with the processor 304, can obtain NFTs for provisioning to user devices. The NFT acquisition module 308A, in conjunction with the processor 304, can generate an NFT request message comprising a first address associated with a user of the user device and a second address associated with an entity, where the entity can be the network processing computer 108.

The NFT acquisition module 308A, in conjunction with the processor 304, can provide the NFT request message for the NFT to a service provider computer associated with a blockchain network that manages NFTs. The service provider computer and a blockchain network can record ownership of the NFT to the first address and the second address.

The NFT acquisition module 308A, in conjunction with the processor 304, can receive an NFT response message from the service provider computer. The NFT response message can include NFT identifying data comprising a contract address and a token identifier. The NFT acquisition module 308A, in conjunction with the processor 304, can then provision the contract address and the token identifier to a user device.

The verification module 308B may comprise code or software, executable by the processor 304, for verifying data. The verification module 308B, in conjunction with the processor 304, can verify data during an interaction. The verification module 308B, in conjunction with the processor 304, can communicate with a service provider computer to validate that the contract address and the token identifier identify the NFT that is assigned to the first address and the second address and that the digital signature is validated using the first address.

The interaction processing module 308C may comprise code or software, executable by the processor 304, for processing an interaction. The interaction processing module 308C, in conjunction with the processor 304, can allow the network processing computer 108 to process interactions. The interaction processing module 308C, in conjunction with the processor 304, can aid in receiving, modifying, and sending authorization request messages and authorization response messages.

The network interface 306 may be similar to the network interface 206 and will not be repeated here.

Figure 4:
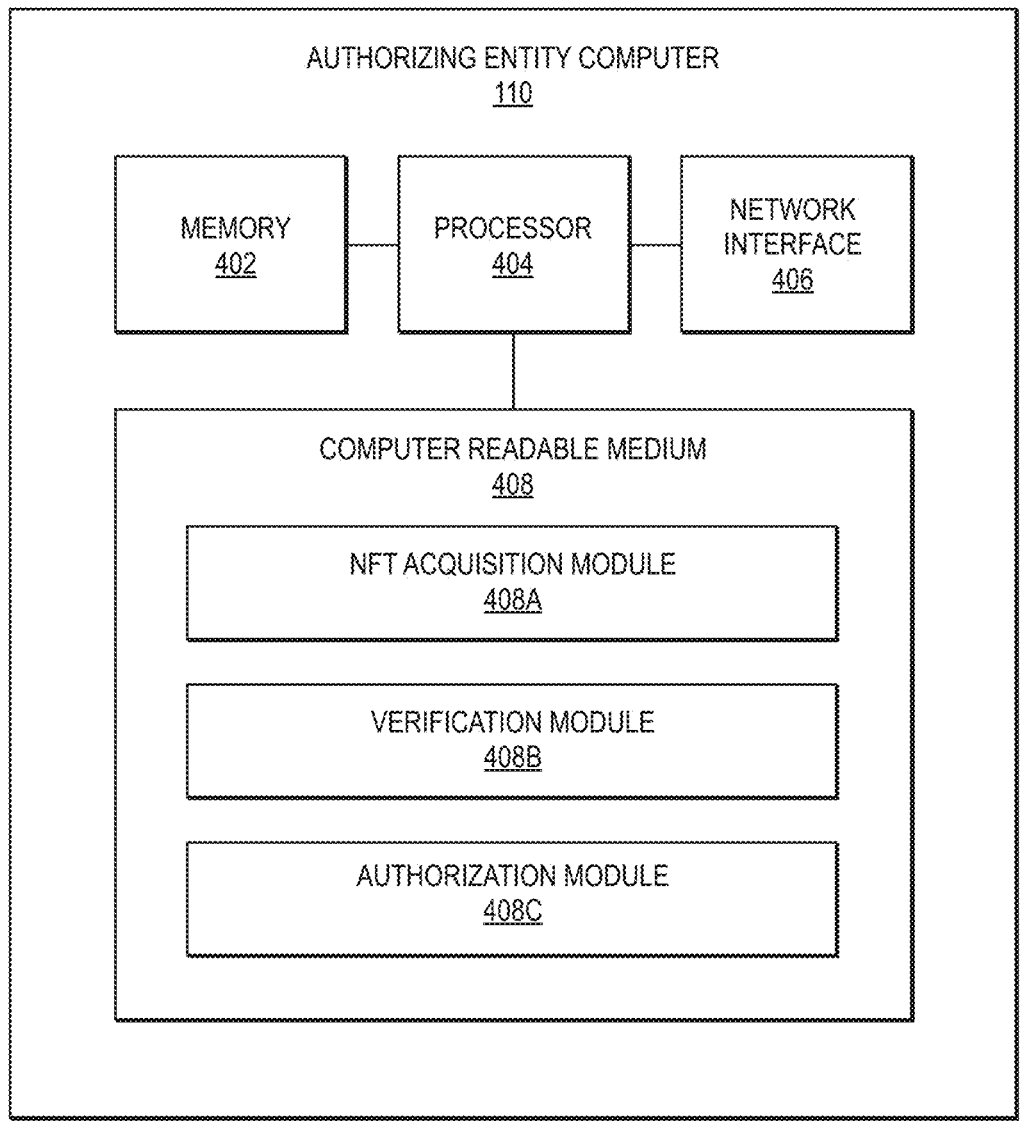
FIG. 4 shows a block diagram of components of an authorizing entity computer according to embodiments.

FIG. 4 shows a block diagram of an authorizing entity computer 110 according to embodiments. The exemplary authorizing entity computer 110 may comprise a processor 404. The processor 404 may be coupled to a memory 402, a network interface 406, and a computer readable medium 408. The computer readable medium 408 can comprise a NFT acquisition module 408A, a verification module 408B, and an authorization module 408C.

The memory 402 can be used to store data and code and may be similar to the memory 202 as described herein. For example, the memory 402 can store user accounts maintained on behalf of users of user devices.

The computer readable medium 408 may comprise code, executable by the processor 404, for performing a method comprising: receiving an authorization request message comprising a contract address and a token identifier during an interaction between a user device and a resource provider computer; verifying that an NFT, referenced by the contract address and the token identifier, is assigned to a first address and a second address; and if verified, determining a credential stored in association with the contract address and the token identifier using a conversion table.

The NFT acquisition module 408A may comprise code or software, executable by the processor 404, for obtaining NFTs. The NFT acquisition module 408A, in conjunction with the processor 404, can obtain NFTs for provisioning to user devices. The NFT acquisition module 408A, in conjunction with the processor 404, can generate an NFT request message comprising a first address associated with a user of the user device and a second address associated with an entity, where the entity can be the authorizing entity computer 110.

The NFT acquisition module 408A, in conjunction with the processor 404, can provide the NFT request message for the NFT to a service provider computer associated with a blockchain network that manages NFTs. The service provider computer and a blockchain network can record ownership of the NFT to the first address and the second address.

The NFT acquisition module 408A, in conjunction with the processor 404, can receive an NFT response message from the service provider computer. The NFT response message can include NFT identifying data comprising a contract address and a token identifier. The NFT acquisition module 408A, in conjunction with the processor 404, can then provision the contract address and the token identifier to a user device.

The verification module 408B may comprise code or software, executable by the processor 404, for verifying data. The verification module 408B, in conjunction with the processor 404, can verify data during an interaction. The verification module 408B, in conjunction with the processor 404, can communicate with a service provider computer to validate that the contract address and the token identifier the NFT is assigned to the first address and the second address and that the digital signature is validated using the first address.

The authorization module 408C can include may comprise code or software, executable by the processor 404, for authorizing interactions. The authorization module 408C, in conjunction with the processor 404, can determine whether or not to authorize an interaction between a user device and a resource provider computer. The authorization module 408C, in conjunction with the processor 404, can evaluate an account maintained by the authorizing entity computer 110 on behalf of the user of the user device to determine if the user has sufficient funds for the interaction. The authorization module 408C, in conjunction with the processor 404, can determine whether or not to authorize the interaction based on any suitable data, for example, user fund amounts, fraud rates, interaction request rates, amount sizes, credit limits, expiry dates, etc.

The network interface 406 may be similar to the network interface 206 and will not be repeated here.

Embodiments can use the systems and apparatuses described herein to at least provision NFTs as credentials and verify the NFTs. FIGS. 5-8 describe some examples of such methods.

Figure 5:
FIG. 5 shows a flow diagram illustrating a provisioning method according to embodiments.

FIG. 5 shows a flow diagram illustrating a provisioning method according to embodiments. The method illustrated in FIG. 5 will be described in the context of a server computer 502 provisioning an NFT to a user device 102 upon request of the user device 102.

The method illustrated in FIG. 5 allows for server computers that issue credentials to users of user devices to integrate with service provider computers to issue non-fungible tokens as credentials. Server computers can communicate with service provider computers to generate, or otherwise obtain, non-fungible tokens to provide to user devices.

In some embodiments, at step 1, the user device 102 can generate an NFT request message that requests an NFT as a credential from the server computer 502. The NFT request message can include a user public key of the user of the user device 102. The user public key can be utilized as a public address on a blockchain, to which the NFT can be assigned. The NFT request message can also include a user device identifier or other data that identifies the user device 102 and/or the user of the user device 102 to the server computer 502 (e.g., an email address, a phone number, a biometric, etc.).

In other embodiments, the server computer 502 can provide an NFT to the user device 102 without receiving an NFT request message from the user device 102. In such a case, the server computer 502 can push the NFT to the user device 102. If the server computer 502 provides the NFT to the user device 102, the server computer 502 can generate an NFT request message, on behalf of the user device 102. The server computer 502 may already have the user public key of the user in a user database, to which the NFT is to be assigned.

The NFT request message can include a first address associated with a user of the user device 102 and a second address associated with an entity. The first address can be the user public key. The second address can be a server computer public key. For example, if the server computer 502 is an authorizing entity computer, then the second address can be an authorizing entity public key, whereas, if the server computer 502 is a processing network computer, then the second address can be a processing network public key. As such, the entity can be the authorizing entity or a processing network entity.

In some embodiments, the server computer 502 can verify that the user of the user device 102 is eligible to obtain an NFT as a credential. The server computer 502 can verify the user's identity, perform a credit check, a background check, and/or other process to determine data relevant to provisioning a credential.

Further, the server computer 502 can identify a credential that is already assigned to the user of the user device 102. For example, the user may have previously been issued a credential, such as a primary account number (PAN). The credential can be stored in a database by the server computer 502 along with user and/or user device 102 identifying data.

In some embodiments, the server computer 502 can indicate a specific NFT on the NFT blockchain, which is to be issued to the user of the user device 102, in the NFT request message.

The server computer 502 can also determine an expiry date for the NFT. The expiry date can be a future date at which the NFT can no longer be utilized in transactions. In some embodiments, the server computer 502 can determine the expiry date based on a predetermined static length of time. In other embodiments, the server computer 502 can determine the expiry date based on any data available to the server computer 502 regarding the user and/or the user device 102.

At step 2, after receiving the NFT request message, or otherwise deciding to provision an NFT to the user device 102, the server computer 502 can provide the NFT request message to the service provider computer 112 that is associated with a blockchain network (not shown in FIG. 5) that manages NFTs, or it can generate the NFT request message upon receiving an instruction to do so from the user device 102.

After receiving the NFT request message, the service provider computer 112 can determine an NFT to obtain on behalf of the server computer 502 from the NFT blockchain network (not shown in FIG. 5). The service provider computer 112 can communicate with the NFT blockchain network to record ownership of the NFT to the first address and the second address. As such, the NFT can be co-owned between the user of the user device 102 and the server computer 502 (or the entity that operates the server computer).

The service provider computer 112 can generate a NFT response message comprising the NFT identifying data. The obtained NFT can be identified by NFT identifying data comprising a contract address and a token identifier. The NFT response message can indicate that ownership of the NFT is assigned to the first address and the second address.

At step 3, after recording ownership of the NFT to the first address and the second address, the service provider computer 112 can provide the NFT response message to the server computer 502.

The server computer 502 can receive the NFT response message comprising the NFT identifying data comprising the contract address and the token identifier that identifies the NFT.

After receiving the NFT response message, the server computer 502 can store data relating to the NFT in a database. The server computer 502 can store the contract address and the token identifier (which, in combination, identify the NFT) in association with the credential (which was already issued to the user). As such, the server computer 502 can add the contract address, token identifier, and credential to a conversion table that converts issued NFTs to issued credentials.

The server computer 502 can also store the expiry date in association with the contract address, the token identifier, and the credential. In some embodiments, the server computer 502 can store a credit limit and/or other data in association with the credential.

At step 4, the server computer 502 can provide the NFT identifying data comprising the contract address and the token identifier to the user device 102.

The user device 102 can store the NFT identifying data. For example, the user device 102 can store the NFT identifying data in a digital wallet application installed on the user device 102.

At some point later in time, the user device 102 can initiate an interaction, as described in further detail in reference to FIG. 6. The user device 102 can subsequently provide the NFT identifying data to the entity in an interaction, wherein the entity validates the NFT in the interaction.

In some embodiments, upon expiry of the NFT as indicated by the expiry date, the ownership of the NFT can be transferred to the server computer 502. The transfer in ownership at the expiry date can be indicated in the smart contract that is stored in the NFT blockchain and which records ownership of the NFT.

When the NFT expires, the user's ownership of the NFT can be revoked. The user's ownership of the NFT can be revoked using the smart contract that is associated with the NFT. For example, the smart contract can include code that executes when a current time reaches a predetermined expiry time for the NFT. The smart contract can originally be created by the issuer of the NFT to include conditions, such as an expiry date, which relate to NFTs associated with the smart contract. The expiry date can indicate that NFTs issued by the issuer of the NFT can remain active and co-owned with a user for a set number of days, months, years, etc.

In some embodiments, the smart contract can create a new entry to include into the blockchain that indicates an ownership change of the NFT. The entry can be included in a new block of the NFT blockchain. The entry can indicate the user's public key is no longer to be included in the NFT. By removing the user's public key from the NFT, and posting such to the NFT blockchain, the user can no longer utilize the NFT during interaction. If the user tries to utilize the expired NFT during a transaction, entities that verify the ownership of the NFT will not find the user's public key in the NFT referenced by the smart contract in the blockchain and thus will deny the transaction.

Furthermore, since the NFT is co-owned between the issuer of the NFT and the user, when the smart contract removes the user's public key from the NFT, as indicated in the new entry for the blockchain, only the issuer will be listed as an owner of the NFT. In some embodiments, the issuer of the NFT can then issue the NFT to a new user, which can be another user or the same user, to utilize during interaction. In other embodiments, the issuer of the NFT can list the NFT for sale on the NFT blockchain.

Figure 6:
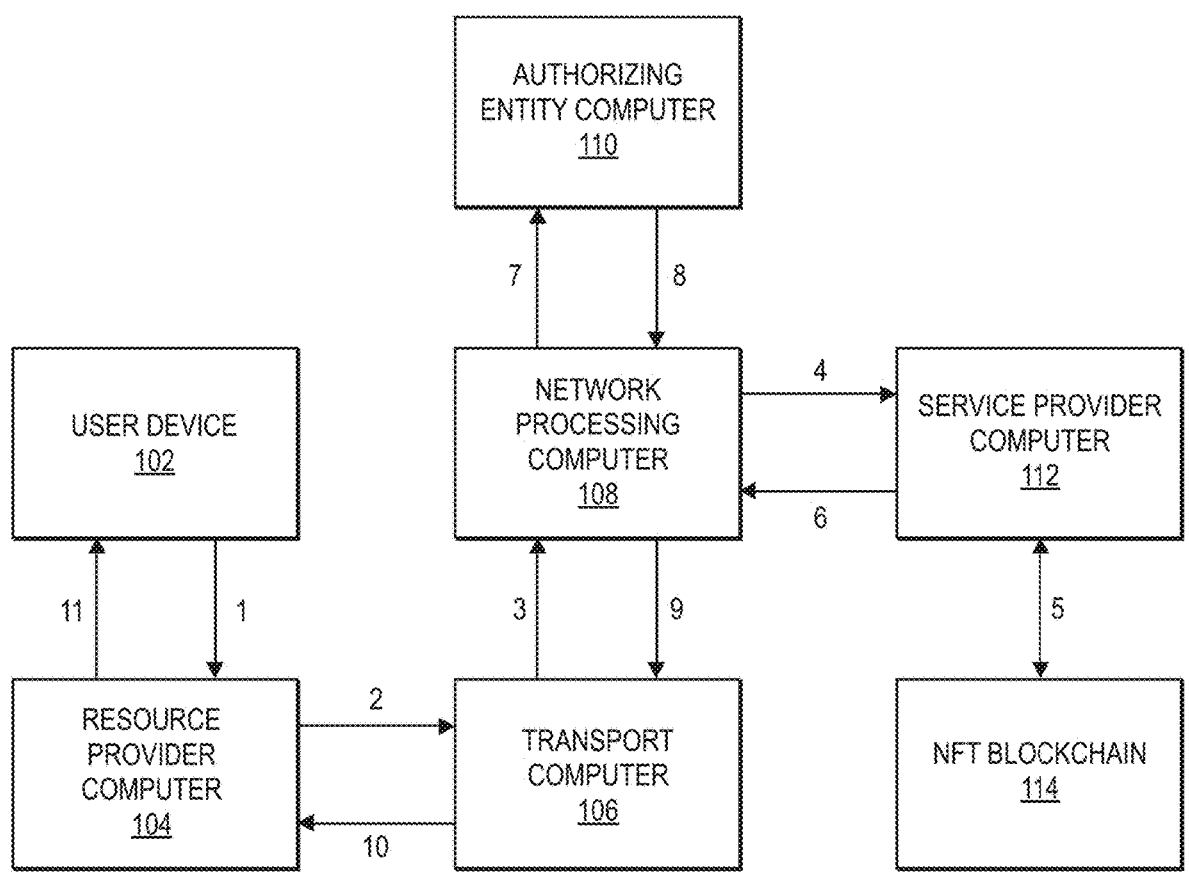
FIG. 6 shows a flow diagram illustrating a verification method according to embodiments.

FIG. 6 shows a flow diagram illustrating a verification method according to embodiments. The method illustrated in FIG. 6 will be described in the context of a user device 102 utilizing an NFT as a credential during an interaction to obtain a resource from a resource provider computer 104. It is understood, however, that the invention can be applied to other circumstances (e.g., where the interaction is a location access interaction, a data access interaction, a secure webpage access interaction, a payment transaction, etc.).

Prior to step 1, the user device 102 can obtain an NFT as described above. The user device 102 can communicate with the resource provider computer 104 to initiate an interaction. For example, the user device 102 can communicate with a website hosted by the resource provider computer 104. The user of the user device 102 can utilize the user device 102 to select one or more resources to obtain on the website from the resource provider computer 104 in an interaction (e.g., a transaction). The user device 102 can generate an interaction request message to request to perform an interaction with the resource provider computer 104. The interaction request message can be initiated by the user of the user device 102 via a checkout button or other element on the website.

The interaction request message can include NFT identifying data and the one or more selected resources. The NFT identifying data can include a contract address and a token identifier. The NFT can be identified by the token identifier. The token identifier can be a unique value, which is included inside the smart contract (e.g., ERC-721) for the non-fungible token referenced by the contract address. The contract address can be an address that identifies the smart contract on a blockchain that created, maintains, and transfers the non-fungible token. The token identifier and the contract address, as a pair, are globally unique and can function as a fully qualified identifier for a specific asset on a blockchain.

The interaction request message can further include a digital signature. The digital signature can be created by the user device 102 using a user private key that corresponds to a user public key, where the user public key is a key to which the NFT is assigned (e.g., is owned by).

At step 1, the user device 102 can provide the interaction request message comprising at least the contract address, the token identifier, and the digital signature to the resource provider computer 104.

As an illustrative example, the user device 102 can provide the interaction request message to the resource provider computer 104 to obtain a selected resource of a datafile. The interaction request message can include a contract address of "0x05da517B1bf9999B7762EaEfa8372341A1a47559," a token identifier of "3914," and a digital signature formed using the user private key. The interaction request message can also include data relating to the selected item (e.g., an item name of "digital_file_003", an amount of $5, etc.).

After receiving the interaction request message, the resource provider computer 104 can generate an authorization request message comprising the contract address, the token identifier, and the digital signature. The authorization request message can also include an amount, as determined from the one or more selected resources, a date, a time, and/or other data utilized to verify, process, authenticate, and/or authorize the interaction. Other information that can be included in the authorization request message is described above, and it can be in an ISO 8583 data format.

In some embodiments, the contract address, the token identifier, and the digital signature can be in a supplemental data field, and the authorization request message can include a 16 digit access token (e.g., a payment token) to route the authorization request message to the network processing computer 108. In some embodiments, the authorization request message can include an NFT flag that can indicate that the interaction is to be processed using the NFT.

At step 2, the resource provider computer 104 can provide the authorization request message to the transport computer 106.

At step 3, after receiving the authorization request message, the transport computer 106 can provide the authorization request message to the network processing computer 108.

After receiving the authorization request message from the transport computer 106, the network processing computer 108 can determine which method of a plurality of methods to utilize to process the interaction. For example, first method can be to provide the authorization request message to the authorizing entity computer 110 for authorization if the authorization request message already includes a credential for the user. A second method, which will be further discussed herein, is that the network processing computer 108 can determine a credential that is associated with the NFT, as identified by the contract address and the token identifier, prior to providing the authorization request message to the authorizing entity computer 110.

The network processing computer 108 can determine that the authorization request message includes the contract address and the token identifier, and optionally the NFT flag. After determining that the contract address and the token identifier have been included in the authorization request message, the network processing computer 108 can first verify the NFT and then determine a credential associated with the NFT.

In some embodiments, the network processing computer 108 can determine whether or not the contract address and the token identifier are expired based on the stored expiry date. For example, the network processing computer 108 can determine if the current date of (e.g., Jan. 15, 2025) exceeds the expiry date (e.g., Jun. 25, 2025). If the contract address and the token identifier are expired, then the server computer 502 can generate and provide an authorization response message to the resource provider computer 104 that indicates that the interaction is not authorized.

At step 4, the network processing computer 108 can communicate with the service provider computer 112 to verify the NFT. For example, the network processing computer 108 can verify that the NFT, referenced by the contract address and the token identifier, is assigned to a first address and a second address. The first address can be the user public key, while the second address can be a server computer public key. The server computer public key can be a network processing computer public key or an authorizing entity computer public key.

In particular, the network processing computer 108 can generate a verification request message that requests the service provider computer 112 to verify the authenticity of the NFT. The verification request message can include the contract address, the token identifier, and the digital signature.

In some embodiments, rather than communicating with the service provider computer 112 to verify the NFT, the network processing computer 108 can provide the authorization request message to the authorizing entity computer 110. The authorizing entity computer 110 can subsequently communicate with the service provider computer 112 to verify the NFT.

At step 5, the service provider computer 112 can communicate with the NFT blockchain 114 to verify the authenticity of the digital signature and that the NFT is assigned to the first address and the second address. For example, the service provider computer 112 can look up the NFT and the smart contract on the NFT blockchain 114 using the contract address and the token identifier. For example, the service provider computer 112 can search the NFT blockchain 114 for the contract address of "0x05da517B1bf9999B7762EaEfa8372341A1a47559".

After finding the smart contract, the service provider computer 112 can identify the NFT associated with the smart contract with the token identifier of "3914".

The service provider computer 112 can evaluate the smart contract to determine whether or not the NFT is assigned to the first address and the second address. If the NFT is assigned to the first address and the second address, the service provider computer 112 can further verify that the digital signature was created with the user private key using the user public key (e.g., the first address) as identified in the NFT blockchain 114.

At step 6, after verifying that the contract address and the token identifier identify an NFT that is assigned to the first address and the second address and that the digital signature is validated using the first address, the service provider computer 112 can generate a verification response message. The verification response message can indicate whether or not the NFT was verified. The service provider computer 112 can provide the verification response message to the network processing computer 108.

After receiving the verification response message from the service provider computer 112, the network processing computer 108 can determine whether or not the verification response message indicates that the digital signature is authentic and that the NFT is assigned to (e.g., owned by) the user of the user device 102.

If the verification response message indicates that the NFT is not owned by the user of the user device 102, the network processing computer 108 can generate an authorization response message that includes an authorization indicator that indicates that the interaction is not authorized. The network processing computer 108 can provide the authorization response message to the resource provider computer 104 via the transport computer 106.

If the verification response message indicates that the NFT is owned by the user of the user deice 102, the network processing computer 108 can determine a credential, for the user of the user device 102, stored in associated with the contract address and the token identifier using a conversion table.

For example, the network processing computer 108 can utilize the conversion table to look up the contract address and the token identifier to identify the credential that is included in the conversion table and associated with the contract address and the token identifier.

Upon determining the credential, the network processing computer 108 can modify the authorization request message to include the credential. For example, the network processing computer 108 can remove the contract address and the token identifier from the authorization request message and include the credential into the authorization request message.

At step 7, after modifying the authorization request message, the network processing computer 108 can provide the authorization request message to the authorizing entity computer 110 for authorization of the interaction.

After receiving the authorization request message, the authorizing entity computer 110 can determine whether or not to authorize the interaction. The authorizing entity computer 110 can generate an authorization response message comprising an indication of whether or not the interaction is authorized. The authorization response message can further include the credential.

At step 8, after generating the authorization response message, the authorizing entity computer 110 can provide the authorization response message to the network processing computer 108.

After receiving the authorization response message the network processing computer 108 can modify the authorization response message to replace the credential with the contract address and the token identifier.

At step 9, the network processing computer 108 can provide the authorization response message to the transport computer 106.

At step 10, after receiving the authorization response message, the transport computer 106 can provide the authorization response message to the resource provider computer 104.

After receiving the authorization response message, the resource provider computer 104 can evaluate the authorization response message to determine whether or not the interaction is authorized. If the interaction is authorized, then the resource provider computer 104 can proceed with providing the selected resource(s) to the user of the user device 102.

At step 11, the resource provider computer 104 can provide the authorization response message or the indication of whether or not the interaction is authorized to the user device 102.

At the end of the day or any other suitable time after the transaction is authorized, a clearing and settlement process can occur between the transport computer 106, the network processing computer 108, and the authorizing entity computer 110.

FIG. 6 shows a block diagram illustrating a non-fungible token according to embodiments. FIG. 6 illustrates an example non-fungible token 600 and data included therein. The non-fungible token 600 includes a token identifier 610, a contract address 620, and metadata 630.

The non-fungible token 600 is identified by the token identifier 610. The token identifier 610 can be a unique uint256 value, which is included inside the smart contract (e.g., ERC-721) for the non-fungible token referenced by the contract address 620. The token identifier 610 is a static value for the life of the contract as indicated in the associated smart contract. Each non-fungible token 600 for a certain smart contract should have a different token identifier 610.

The contract address 620 can be an address that identifies a smart contract on a blockchain that created, maintains, and transfers the non-fungible token 600. The token identifier 610 and the contract address 620, as a pair, are globally unique and can function as a fully qualified identifier for a specific asset on a blockchain.

Ownership of the non-fungible token 600 is managed through the token identifier 610 and the metadata 630 that no other token can replicate. Non-fungible tokens are minted through smart contracts that assign ownership and manage the transferability of the non-fungible tokens. When a computer creates or mints a non-fungible token, the computer executes code stored in smart contracts that conform to different standards, such as ERC-721. This information is added to the non-fungible token blockchain where the non-fungible token 600 is being managed.

Ownership of the non-fungible token 600 can be proven. Proving that an entity owns the non-fungible token 600 can be similar to proving that an entity owns a cryptocurrency in their account. For example, when an entity purchases the non-fungible token 600, the ownership of the token identifier 610 is transferred to a digital wallet of the entity via the entity's public address (e.g., public key). The private key corresponding to the public key is proof-of-ownership of the non-fungible token 600. A digital signature created by the private key corresponding to the public key, to which the non-fungible token 600 is assigned, can function as proof that the entity supplying the signature owns the non-fungible token 600.

The metadata 630 for the non-fungible token 600 can be implemented in an on-chain framework or in an off-chain framework. In the on-chain framework, which is illustrated in FIG. 6, the metadata 630 is included in the non-fungible token 600 itself and stored on the blockchain. In the off-chain framework, the metadata 630 included in the non-fungible token 600 can be a URI that links to a location where the metadata content is stored. For example, off-chain metadata can be stored in any long term database or network such as the InterPlanetary File System, which is a protocol, hypermedia, and file sharing peer-to-peer network for storing and sharing data in a distributed file system.

The metadata 630 can include a name 632, a description 634, attributes 636, an image 638, and/or other data that describes the non-fungible token 600 (e.g., animation URLs, external URLs, video URLs, etc.). The name 632 can be a name given to the non-fungible token 600 (e.g., by the creator of the non-fungible token 600). The description 634 can be a description written about the non-fungible token 600 (e.g., by the creator of the non-fungible token 600). The attributes 636 can include data that relates to how the non-fungible token 600 was created in, for example, a procedural content generation process. The attributes 636 can include selected attributes for the non-fungible token 600 such as character color, character birthday, base shapes, eye color, etc. For example, the attributes 636 can include data relating to how the image 638 of the non-fungible token 600 was generated. The image 638 can include a graphic created by the creator of the non-fungible token 600.

Figure 7:
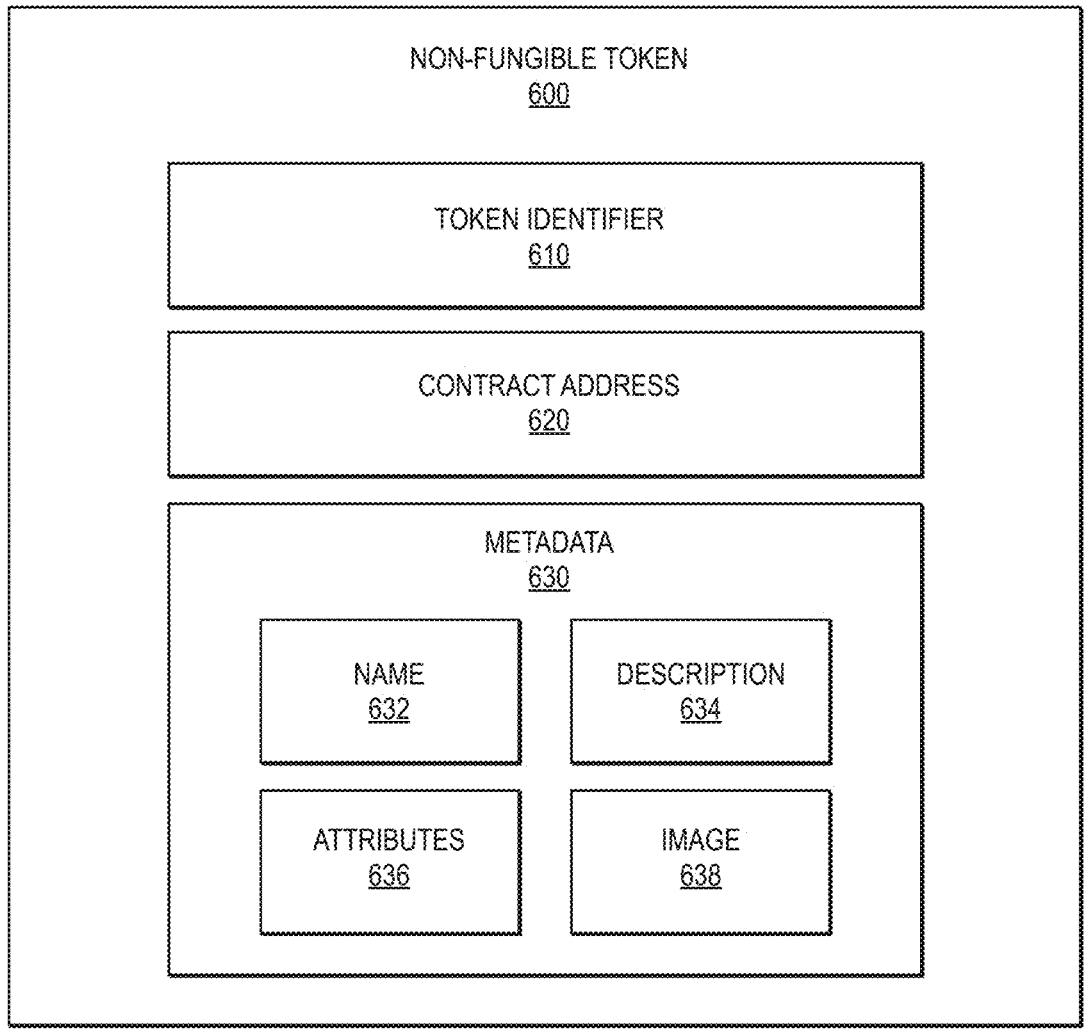
FIG. 7 shows a block diagram of a non-fungible token according to embodiments.
Figure 8:
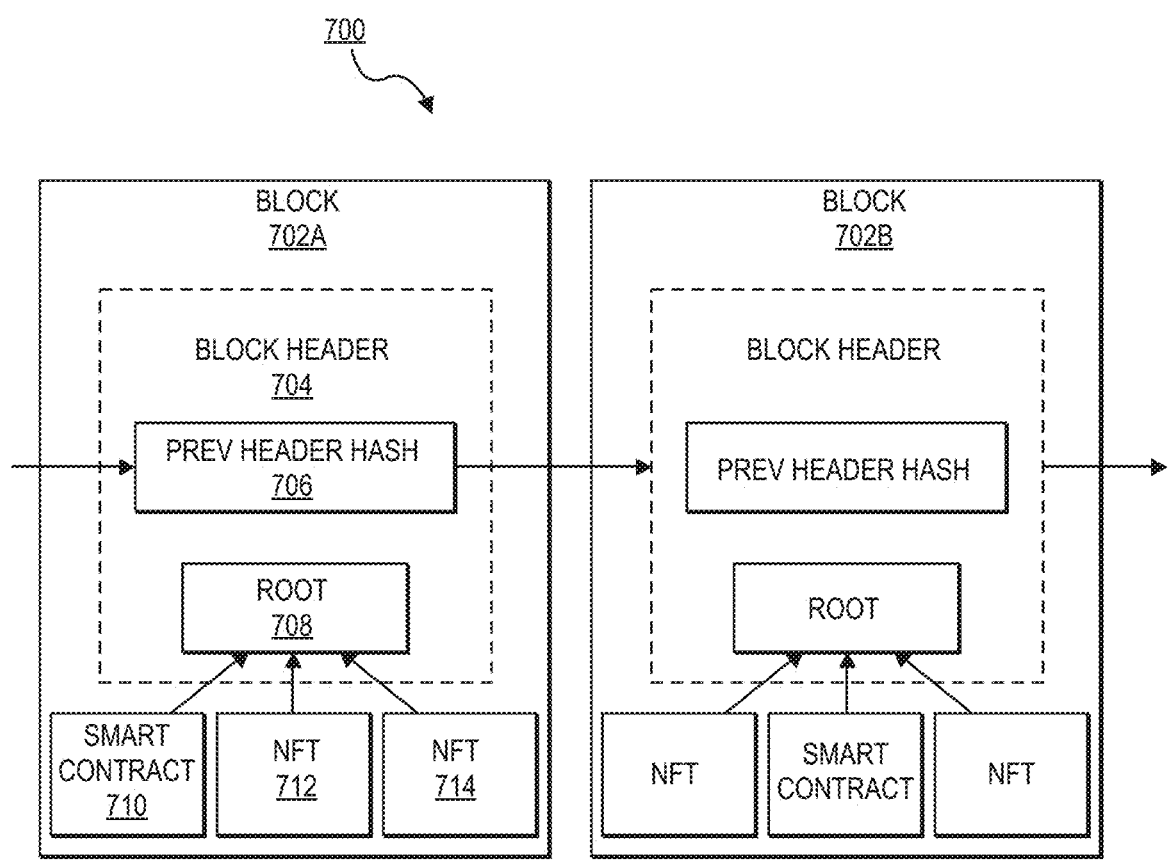
FIG. 8 shows a block diagram of a non-fungible token blockchain according to embodiments.

FIG. 7 shows a block diagram illustrating a first blockchain according to embodiments. A blockchain 700 can include a list of blocks of non-fungible tokens, the blocks are cryptographically chained together as depicted in FIG. 7. A block is created by a computationally intensive process called proof-of-work in which valid blocks need to demonstrate a sufficient "difficulty" (e.g., sufficient computation power to create on average). In some embodiments, the first blockchain can utilize a proof-of-stake process rather than a proof-of-work process. If there is more than one available chain of blocks, then network participants (e.g., nodes) need to download all blocks in all chains and follow the chain which has the highest total difficulty. This mechanism guarantees that, eventually, the network will agree on a single and valid chain.

FIG. 7 shows an example blockchain format. However, it is understood that other formats and data structures can be utilized. The blockchain 700 can comprise a plurality of blocks, for example, block 702A and block 702B. Each block can comprise a block header, for example, block 702A comprises block header 704.

The block header 704 can include multiple data elements, such as a previous header hash 706 and a Merkle root 708.

The previous header hash 706 can be a hash of the previous block's header. The Merkle root 708 can be a root of a Merkle tree, which is a tree in which every leaf node is labelled with the hash of a data block, for example, data in the smart contract 710 and the non-fungible tokens 712 and 714. Each leaf of the Merkle tree can represent one of the smart contracts 710 or the non-fungible tokens 712 or 714.

Embodiments of the disclosure have a number of advantages. For example, embodiments solve the technical problem of credentials only being able to be utilized within particular processing networks. Embodiments solve this technical problem by utilizing non-fungible tokens as credentials that can be validated by any entity in any processing network.

For example, an NFT can neither be replaced nor interchanged (e.g., with a fake NFT) because it has unique properties. Embodiments allow for the issuer to issue an NFT to a user to be utilized as a credential. Since the NFT cannot be interchanged, the NFT can be properly utilized as a credential. When a computer in a processing network receives the NFT, the computer can verify the ownership of the NFT using a digital signature. This verification can be performed by anyone in the interaction chain and hence the availability and dependency of a particular network is not a concern.

Embodiments provide for additional advantages. For example, the NFT can be co-owned between a user and an issuer of the NFT. The co-owned NFT can allow the user to claim ownership of the NFT during a transaction, while the issuer can maintain control over the NFT. The issuer of the NFT can implement smart contracts that revoke user ownership at an expiry date/time. This is advantageous because the issuer can then reutilize the NFT (e.g., recycle the NFT) for other users or the same user. The issuer can issuer the NFT to a new user for use in interactions. The NFT itself can have intrinsic value and may be traded away or sold by the issuer of the NFT. This is beneficial when contrasted with physical badges or cards, which are typically discarded after expiring. Further, in some cases, the user may request to purchase the NFT from the issuer of the NFT after expiry of the NFT for use in interactions. The user can collect and own the NFT.

Further embodiments of the invention improve transaction security, because real credentials such as payment account numbers need not be exposed or provided to resource providers such as merchants. The resource providers only receive an indication of an NFT which can be public, yet verified (e.g., cryptographically) to be owned by an authentic user. In some instances, the use of an NFT as a substitute for a credential can be more secure than a substitute number for the credential. The substitute number could still be obtained by an unauthorized person and used, whereas the NFT proof of ownership requires a cryptographic signature. Someone that steals the NFT or the NFT identifying data would still need to have the private key that proves ownership before they could conduct a transaction with the NFT.

Although the steps in the flowcharts and process flows described above are illustrated or described in a specific order, it is understood that embodiments of the invention may include methods that have the steps in different orders. In addition, steps may be omitted or added and may still be within embodiments of the invention.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
    generating, by a server computer, an NFT request message comprising a first address associated with a user of a user device and a second address associated with an entity;
    providing, by the server computer, the NFT request message for a non-fungible token (NFT) to a service provider computer associated with a blockchain network that manages NFTs, wherein the service provider computer and the blockchain network records ownership of the NFT to the first address and the second address;
    receiving, by the server computer from the service provider computer, NFT identifying data comprising a contract address and a token identifier that identifies the NFT;
    providing, by the server computer, the NFT identifying data comprising the contract address and the token identifier to the user device;
    receiving, by the server computer, an authorization request message comprising a transaction amount, the contract address and the token identifier during an interaction between the user device and a resource provider computer;

verifying, by the server computer, that the NFT referenced by the contract address and the token identifier, is assigned to the first address and the second address;

responsive to verifying that the NFT is referenced by the contract address and the token identifier, is assigned to the first address and the second address, determining, by the server computer, a credential stored in association with the contract address and the token identifier using a conversion table, the credential being a primary account number;

modifying, by the server computer, the authorization request message to include the credential; and providing, by the server computer, the authorization request message to an authorizing entity computer for authorization of the transaction amount for the interaction.

2. The method of claim 1, wherein the authorization request message is from the resource provider computer associated with a resource provider.

3. The method of claim 1 further comprising:
storing, by the server computer, an expiry date in association with the contract address, the token identifier, and the credential.

4. The method of claim 3 further comprising:
determining, by the server computer, whether or not the contract address and the token identifier are expired based on the expiry date.

5. The method of claim 1, wherein the server computer is a processing network computer, wherein the method further comprises:
storing, by the processing network computer, the contract address, and the token identifier in association with the credential.

6. The method of claim 1, wherein the resource provider computer is a merchant computer.

7. The method of claim 1, wherein the interaction is a location access interaction, a data access interaction, a secure webpage access interaction, and/or a payment transaction.

8. The method of claim 1, wherein the first address is a user public key and the second address is a server computer public key.

9. The method of claim 1, wherein the interaction is a payment transaction.

10. A server computer comprising:
a processor; and
a non-transitory computer-readable medium coupled to the processor, the non-transitory computer-readable medium comprising code executable by the processor for implementing a method comprising:
generating an NFT request message comprising a first address associated with a user of a user device and a second address associated with an entity;

providing the NFT request message for a non-fungible token (NFT) to a service provider computer associated with a blockchain network that manages NFTs, wherein the service provider computer and the blockchain network records ownership of the NFT to the first address and the second address;

receiving, from the service provider computer, NFT identifying data comprising contract address and a token identifier that identifies the NFT;

providing the NFT identifying data comprising the contract address and the token identifier to the user device;

receiving an authorization request message comprising a transaction amount, the contract address and the token identifier during an interaction between the user device and a resource provider computer;

verifying that an NFT, referenced by the contract address and the token identifier, is assigned to the first address and the second address;

if verified, determining a credential stored in association with the contract address and the token identifier using a conversion table, the credential being a primary account number;

modifying the authorization request message to include the credential; and providing the authorization request message to an authorizing entity computer for authorization of the transaction amount for the interaction.

11. The method of claim 1, wherein the second address is a public key of the server computer.

12. The method of claim 1, wherein the first address is a user public key.

13. The method of claim 1, wherein the contract address identifies a smart contract.

14. The server computer of claim 10, wherein the contract address identifies a smart contract.

15. The server computer of claim 10, wherein the interaction is a payment transaction.

16. The server computer of claim 10, wherein the resource provider computer is a merchant computer.

17. The server computer of claim 10, wherein the server computer is a network processing computer.

18. The server computer of claim 10, wherein the entity validates whether or not the NFT, identified by the NFT identifying data, is associated with the user device in a smart contract identified by the contract address.

19. The server computer of claim 10, wherein the entity is the server computer, wherein the method further comprises:
validating the NFT and the NFT identifying data during the interaction.

20. The server computer of claim 10, wherein the NFT is stored on an NFT blockchain.

* * * * *